A. L. COBB.
EXTENSION CLAMP.
APPLICATION FILED NOV. 7, 1908.
912,543.
Patented Feb. 16, 1909.
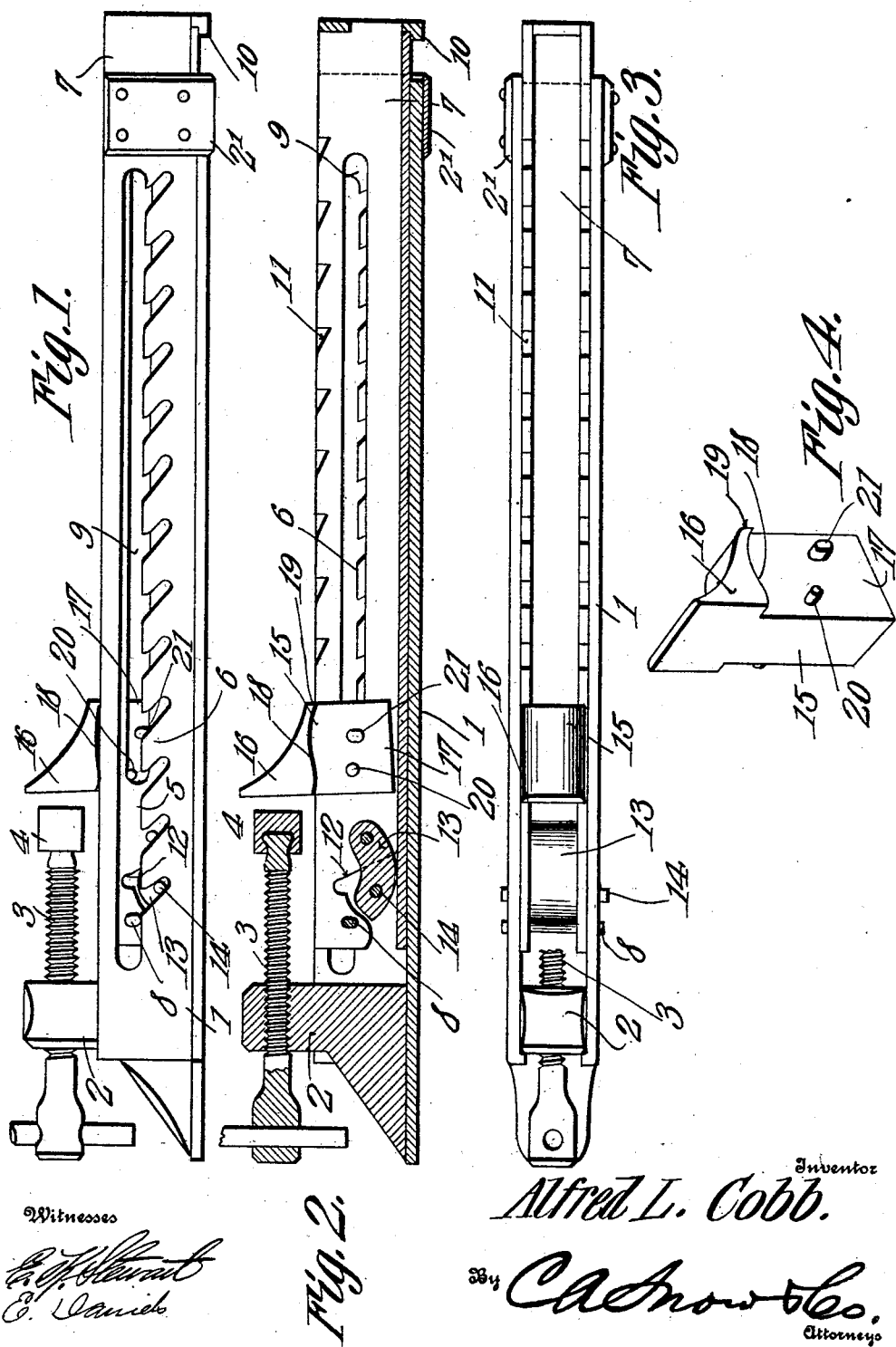
Witnesses
Inventor
Alfred L. Cobb.
By C. A. Snow & Co.,
Attorneys

UNITED STATES PATENT OFFICE.

ALFRED L. COBB, OF ESTES PARK, COLORADO, ASSIGNOR OF FORTY-NINE ONE-HUNDREDTHS TO HARRY B. BOYD, OF ESTES PARK, COLORADO.

EXTENSION-CLAMP.

No. 912,543.    Specification of Letters Patent.    Patented Feb. 16, 1909.

Application filed November 7, 1908. Serial No. 461,555.

*To all whom it may concern:*

Be it known that I, ALFRED L. COBB, a citizen of the United States, residing at Estes Park, in the county of Larimer and State of Colorado, have invented a new and useful Extension-Clamp, of which the following is a specification.

This invention has relation to extension clamps and it consists in the novel construction and arrangement of its parts, as hereinafter shown and described.

The object of the invention is to provide a clamp of the character indicated, which may be extended when in use for the purpose of receiving comparatively large objects, and which may be collapsed or contracted when not in use, thereby occupying small space when in storage or in a tool-chest.

With the above object in view the clamp embodies two members which are telescopically arranged and which are preferably in the form of bodies having longitudinally disposed channels. The channel of one member is adapted to slidably receive the other member, while the channel of the last said member is adapted to slidably receive an adjustable tail stop. A head post is fixed in the end of the channel of the outer member, and a thrust screw engages an interior thread provided in the said post and is adapted to coöperate with the said tail stock in clamping an object. Means is provided for holding the inner member in a desired position along the length of the outer member, and means is provided for holding the tail stock at a desired point along the length of the inner member.

In the accompanying drawings:—Figure 1 is a side elevation of the clamp. Fig. 2 is a longitudinal sectional view of the same. Fig 3 is a top plan view of the same. Fig. 4 is a perspective view of a tail stock used in the clamp.

The extension clamp consists of the member 1, which is preferably in the form of a channeled bar with the channel thereof extending longitudinally. The head post 2 is fixedly mounted in one end portion of the channel of the bar 1, and the thrust screw 3 engages a threaded perforation provided in the head post 2. The screw 3 is provided at the extremity of its threaded end with the usual swiveled block 4. The member 1 is preferably rectangular in cross section, but may be of any other suitable configuration.

The member 1 is provided in its vertical sides with the longitudinally disposed slots 5 which are provided at their lower edges with the spaced teeth 6. Said teeth occupy inclined positions, with their longer dimensions disposed toward that end of the member 1 upon which the post 2 is mounted. The bracing clip 2' is mounted upon said member.

The member 7 is also in the form of a channeled bar with the channel thereof disposed longitudinally. The member 7 in cross section conforms, in general configuration, with the member 1 in cross section. The said member 7 fits snugly within the channel of the said member 1, and the member 7 is provided at its inner end with a pin 8, the end portions of which project beyond the lateral sides of the said member 7 and enter the slots 5 provided in the sides of the member 1. The vertical sides of the member 7 are provided with elongated slots 9, the object of which will be hereinafter explained. That end of the member 7 opposite to the end thereof carrying the pin 8, is provided at its lower side with a depending lug 10, which is adapted to abut against the end of the member 1 when the member 7 is telescoped therein. The upper edges of the sides of the member 7 are provided with the notches 11, the walls of which are inclined toward that end of the said member 7 which carries the pin 8. The member 7 is provided at that end portion adjacent the end which carries the pin 8 with the recesses 12 which are vertically disposed at the lower or bottom side of the said member 7. The block 13 is pivotally mounted at one end between the vertical sides of the member 7 and its other end portion extends transversely across the recesses 12 provided in the said member 7. The free end of the block 13 is provided with a cross-pin 14, the end portions of which project through the recess 12 in the member 7, and also through the slots 5 provided in the member 1, and the said projecting ends of the said pins 14 are adapted to engage the sides of the teeth 6 provided in the lower edges of the slots 5 of the member 1.

The tail stock 15 consists of a head portion 16 and a shank portion 17, which are defined at their points of merger by the shoulders 18, carried by the head portion 16. The shoulders 18 of the said tail stock 15 lie over the upper edges of the sides of the member 7, and the outer extremities of the said shoulders 18 are disposed at acuminate angles to the outer side of the head portion 6 of the stock 15, and are adapted to enter the notches 11 provided in the sides of the member 7. The pins 20 and 21 extend transversely through the shank portion 17 of the tail stock 15, and their end portions project beyond the sides of the said shank and extend into the slots 9 provided in the sides of the member 7. When the tail stock 15 is in an erect or vertical position the pin 20 is located at a higher elevation than the pin 21. But when the said tail stock 15 is swung into an inclined position the centers of the pins 20 and 21 are substantially at the same elevation, and a line drawn from the centers of the said pins will be substantially parallel with the upper and lower edges of the slots 9 provided in the sides of the member 7. When, however, the said tail stock 15 is in an erect or vertical position, the upper sides of the pin 20 will be in contact with the upper edges of the slots 9 in the said member 7, and the lower sides of the end portions of the pin 21 will be in contact with the lower edges of the slots 9 of the said member 7. Also when the said tail stock 15 is in a vertical position, as described, the acuminate ends of the shoulders 18 will be in engagement with opposite notches 11, provided in the upper edges of the sides of the member 7, and when the said tail stock 15 is in an inclined position, the said acuminate end portions 19 of the shoulders 18 will be out of engagement with the notches 11 provided in the sides of the member 7. By such an arrangement, it will be observed that the member 7 may be substantially moved entirely within the sides of the member 1, and the block 13 may be swung down, so that the pin 14 carried thereby will be in engagement with the teeth 6 provided at the lower edges of the slots 5 of the member 1. Thus, the members will be held in fixed relation to each other, and, by reclining the tail stock 15, so that the acuminate portion 19 of the shoulders 18 will engage the notches 11, the said tail stock may be moved longitudinally along the member 7, and, when at the desired point, the said stock 15 may be brought to an erect position, whereby the said end portions 19 of the shoulders 18 will engage the notches 11, as above described, and the pins 20 and 21 will be brought into contact with the upper and lower edges respectively of the slots 9 of the said member 7. Thus it will be seen that the said tail stock 15 may be adjusted along the member 7, and fixed in an adjusted position thereto, and at any desired distance from the block 4, carried by the thrust screw 3. The parts are adjusted as last above described when it is desired that the clamp shall hold relatively small objects, and such an object is inserted between the face of the tail stock 15 and the said block 4, when the screw 3 is turned in the post 2, and the object is firmly clamped between the block 4 and the tail stock 15.

When it is desired to apply the clamp to a relatively large object, the member 7 is moved longitudinally with relation to the member 1 by disengaging the pin 14 from those particular teeth 6 with which it is in contact, and by slipping the said member 7 within the member 1, and when adjusted to the desired relative positions the said pin 14 is again engaged with the teeth 6 at the lower edges of the slots 5 of the member 1, thus accomplishing major adjustment between the said members. The minor adjustment for the purpose of receiving the object is accomplished by shifting the tail stock 15 along the member 7 as above described, and, when the parts are properly positioned with relation to each other, the thrust screw is turned as above described and the object is securely held in place.

It will therefore be seen that a simple and an effective mechanism is provided for holding both large and small objects, and that when the clamp is not in use the member 7 may be slipped or telescoped within the member 1, and thus the device, as an entirety, will occupy but small space.

Having thus described my invention, what I claim as new, and desire to secure, by Letters Patent, is:—

1. An extension clamp comprising inner and outer telescopic members, both of which are longitudinally slotted, the slot of the outer member being provided, at one edge, with teeth, a pin carried by the inner member and adapted to engage the teeth of the slot of the outer member, a pivoted block supporting said pin, a post mounted upon the outer member, a thrust screw carried by the post, and a tail stock mounted upon the inner member.

2. An extension clamp comprising inner and outer telescopic members, each of which is slotted longitudinally, the slot of the outer member being provided at one edge with teeth, a pin fixed to the inner member and having an end portion projecting through the slot of the outer member, a block pivoted to the inner member, a pin carried by the block and having an end portion projecting into the slot of the outer member and adapted to engage the teeth thereof, a post attached to the outer member, a thrust screw carried by the post and a tail stock mounted upon the inner member.

3. An extension clamp comprising inner and outer telescopic members, each of which is slotted longitudinally, the edge of the slot of the outer member being provided with teeth, a pin fixed to the inner member and having an end portion which projects into the slot of the outer member, a block pivotally mounted in the inner member, a pin carried by the said block and projecting into the slot of the outer member and adapted to engage the teeth at the edge thereof, said inner member being provided at its upper edge with notches, a tail stock having a shouldered head and a shank portion, said shouldered head terminating in an acuminate portion adapted to enter the notches of the said inner member, a pin passing transversely through the shank of the tail stock and projecting, at its end portion, into the slot of the said inner member, a post mounted upon the outer member and a thrust screw carried by the post.

4. An extension clamp comprising inner and outer telescopic members, each of which is slotted longitudinally, the edge of the slot of the outer member being provided with teeth, a pin carried by the inner member and projecting, at its end, into the slot of the outer member, a block pivotally mounted in the inner member, a pin carried by said block, and projecting, at its end portion, into the slot of the outer member and adapted to engage the teeth of the slot, said inner member being provided, at its upper edge, with notches, a tail stock having a shouldered head portion and a shank portion, the shoulders of the said head portion terminating in acuminate portions adapted to enter the notches of the inner member, pins passing transversely through the shank of the tail stock and lying at their end portions in the slot of the inner member, said pins being at different elevations when the tail stock is in an erect position, and being in engagement with the upper and lower edges respectively of the slot of the inner member, a post mounted upon the outer member and a thrust screw carried by the said post.

5. An extension clamp comprising inner and outer telescopic members, means for holding the said members at adjusted positions with relation to each other, a thrust means carried by the outer member, said inner member having notches at its upper edge and being slotted longitudinally, a tail stock having a shouldered head portion and a shank portion which slidably engages the inner member, the shoulder of the head portion terminating in an acuminate portion adapted to engage the notches of the inner member, pins passing transversely through the shank of the tail stock and lying at their end portions in the slot of the inner member, said pins being at different elevations when the said stock is in an erect position, and having contact with the upper and lower edges of the said slot.

In testimony that I claim the foregoing as my own, I have hereto affixed my signature in the presence of two witnesses.

ALFRED L. COBB.

Witnesses:
R. H. TALLANT,
W. T. PARKE.